United States Patent [19]

Merritt

[11] 4,095,732
[45] Jun. 20, 1978

[54] METHOD AND APPARATUS FOR ACCURATELY CONTROLLING THE POSITION OF A FILM TRANSPORT DEVICE

[75] Inventor: Lauren V. Merritt, Sierra Madre, Calif.

[73] Assignee: Xerox Corporation, Stamford, Conn.

[21] Appl. No.: 755,407

[22] Filed: Dec. 29, 1976

[51] Int. Cl.² .................... B65H 23/18; B65H 25/24
[52] U.S. Cl. ........................................ 226/33; 226/43; 226/49; 226/143; 360/72; 360/74
[58] Field of Search .............. 226/33, 42, 43, 49, 226/50, 51, 143; 360/72, 74; 242/188

[56] References Cited

U.S. PATENT DOCUMENTS

| | | | |
|---|---|---|---|
| 3,248,030 | 4/1966 | Ganzhorn | 226/33 |
| 3,270,930 | 9/1966 | Emerson | 226/33 |
| 3,715,090 | 2/1973 | Kostusiak et al. | 226/33 X |
| 3,904,099 | 9/1975 | Inoue | 226/33 |

Primary Examiner—Bruce H. Stoner, Jr.
Attorney, Agent, or Firm—James J. Ralabate; Irving Keschner; Franklyn C. Weiss

[57] ABSTRACT

Method and apparatus for use in a web transport system wherein the web is stopped at a position it occupied when an event occurs. In particular, a motor driven capstan is provided to drive a web, such as a filmstrip, between first and second reels. A tachometer, operatively coupled to the capstan motor, provides a first signal representing the actual film velocity. The first signal is applied to an integrator which is controlled in a manner whereby during normal operation of the web transport system the integrator is off and does not affect system performance. When the event occurs requesting the capstan drive motor to stop, the integrator is enabled and provides an output which is proportional to the distance traveled during deceleration of the capstan drive motor (overshoot). The output of the integrator is coupled to first summing junction whereat it is added to a signal representing the desired film velocity which is driven to zero upon occurrence of the event. The integrator output, if it were operable, is of opposite polarity to the desired film velocity signal. The combined signals are coupled through an acceleration limiter to a second summing junction and compared with the tachometer output. The output of the second summing junction causes the capstan motor to turn in the direction opposite to that before the occurrence of the event, the integrator signal being driven to zero by the tachometer output, the motor velocity and overshoot thereby being driven to zero simultaneously.

12 Claims, 5 Drawing Figures

METHOD AND APPARATUS FOR ACCURATELY CONTROLLING THE POSITION OF A FILM TRANSPORT DEVICE

BACKGROUND OF THE INVENTION

In various applications requiring operations on a web of material (film) a web must be transported past an operating station, usually from a web supply to a web take-up mechanism. The web of material may assume diverse configuration dependent upon the particular use thereof and the operations performed thereon. Thus, the web may comprise a film strip upon which information is recorded and retrieved, such as microfilm.

Prior art transport devices may utilize a driven capstan adapted for bi-directional operation to pull the film from a supply reel to a take-up reel. A reversible motor mechanically coupled to the capstan is controlled by a servo system to dictate the direction of travel of the tape, to maintain a substantially constant linear velocity of the film through the processing station, to effect speed changes where required or upon command and to introduce substantial accelerations to the transported film, e.g., during start and stop operations. For most, if not all, of the foregoing controller operations, it is necessary that a substantially constant tension be maintained in the film to minimize the errors attending the recording and retrieval of information, and to minimize wear and tear of the film itself. The film tension achieved in capstan drive film transport systems has generally been adequate. Many of the systems which are designed to provide constant web tension in a direct drive reel-to-reel system also provide means for maintaining the velocity of the web at a substantially constant value. If a high resolution shaft encoder, or tachometer, is utilized in the film path to sense film speed, proper tension is applied to the film to avoid slippage between the film and shaft encoder.

In many applications, such as the searching and retrieval of information from a selected frame between the beginning and end portions of the film, the film being driven in a stepping type of motion, it is required to stop the film at the exact position it occupies when an event occurs, like the detection of a desired frame position. This stopping is primarily accomplished by applying decelerating forces to the capstan. The behavior of idler rollers and dancer arms (if used) located downstream from the driven capstan is usually well behaved, since the stopping action increases the local film tension. The maximum torque deliverable to the upstream rollers is limited to a value proportional to the film tension, which is locally reduced during the stopping action. If the stopping is too abrupt, negative film tension may be generated. This will cause the film to loop away from its designed path. This looping may damage the film if it strikes nearby objects. Additionally, an abrupt restoration of positive film tension after negative tension has been applied to the film may break the film.

Further, looping of the film allows differential speeds to develope between the film and whatever guiding rollers are in the looping region, these differential speeds tending to cause the film to be scratched when positive film/roller contact is re-established. In any of the above situations, the film will generally overshoot the desired position by an undetermined amount, thereby making the further positioning of the film difficult. Thus the film transport designer must limit the acceleration that may be imparted to the film. The benefit is that the film is handled smoothly, and the overshoot becomes defined. The attendant penalty is that the overshoot becomes large.

SUMMARY OF THE PRESENT INVENTION

The present invention provides method and apparatus for use in a web transport system wherein the web is stopped at a position it occupied when an event occurs. In particular, a motor driven capstan is provided to drive a web, such as a filmstrip, between first and second reels. A tachometer, operatively coupled to a capstan motor, provides a first signal representing the actual film velocity. The first signal is applied to an integrator which is controlled in a manner whereby during normal operation of the web transport system the integrator is off and does not affect system performance. When the event occurs requesting the capstan drive motor to stop, the integrator is enabled and provides an output which is proportional to the distance traveled during deceleration of the capstan drive motor (overshoot). The output of the integrator is coupled to a first summing junction whereat it is added to a signal representing the desired film velocity which is driven to zero upon occurrence of the event. The integrator output, if it were operable, is of opposite polarity to the desired film velocity signal. The combined signals are coupled through an accelleration limiter to a second summing junction and compared with the tachometer output. The output of the second summing junction causes the capstan motor to turn in due course in the direction opposite to that before the occurrence of the event, the integrator signal being driven to zero by the tachometer output, the motor velocity and overshoot thereby being driven to zero simultaneously.

It is an object of the present invention to provide a web transport system wherein the web is accurately and smoothly stopped at a desired location after an event occurs.

It is a further object of the present invention to provide method and apparatus for stopping a web being transported from a first reel to a second reel at a predetermined position when a mark on said web corresponding to said predetermined position is detected.

It is still a further object of the present invention to provide method and apparatus for accurately positioning a film being transported between first and second reels at a predetermined position when a mark on said film corresponding to said position is detected, the overshoot of said film from said predetermined position being rapidly reduced to substantially zero.

It is an object of the present invention to provide method and apparatus for use in a web transport system wherein the web is returned to a position that it occupied when a mark thereon corresponding to said position is detected and wherein a controlled integrator is utilized to return the web to said position whereby the overshoot of said web from said position is reduced to substantially zero.

DESCRIPTION OF THE DRAWINGS

For a better understanding of the invention as well as other objects and further features thereof, reference is made to the following description which is to be read in conjunction with the following drawings wherein.

DESCRIPTION OF THE PREFERRED EMBODIMENT

Figure 1:
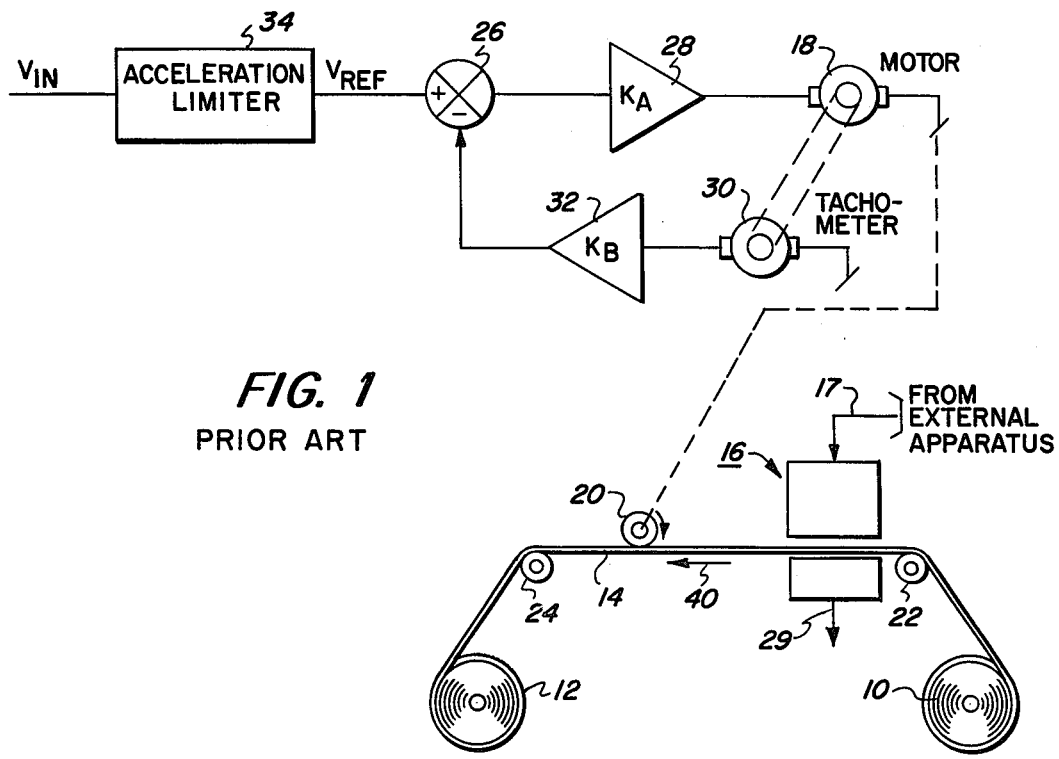
FIG. 1 is a block diagram of a typical prior art web transport system.

FIG. 1 shows a block diagram of a typical prior art web transport system, a web 14 being transported from a first reel 10 to a second reel 12. Web 14 may comprise any suitable material upon which operations are performed, such as information storage tape, microfilm, a paper web or the like. In the preferred embodiment, web 14 comprises microfilm. The web is adapted for bi-directional transport through a processing station 16. As illustrated, the web 14 is transported between reels 10 and 12. Depending upon the direction of transport, the web is paid out from a supply reel and received on a take-up reel. Thus, if the web is transported from reel 10 reel 12, the reel 10 may be designated the supply reel and the reel 12 may be designated the take-up reel. Conversely, when the direction of web transport is reversed, i.e., in a rewind mode, such that web 14 is paid out from reel 12, reel 12 may now be designated the supply reel and reel 10 designated the take-up reel. It is therefore appreciated that the designations supply reel and take-up reel are not fixed to identify specific components of the illustrated apparatus but on the contrary describe the relative functions of reels 10 and 12 when web 14 is transported therebetween in a first or second direction.

Motor 18, which may be a DC motor, is mechanically coupled to a capstan 20 which supplies the driving force to move the tape from reel 10 to reel 12 or vice versa as set forth hereinabove. The driving of capstan 20 by motor 18 results in the pulling of web 14 from reel 10 to reel 12 over idler rollers 22 and 24. Conversely, the direction of web transport may be reversed, for example, when the transport system is in the rewind mode. The direction of rotation of motor 18 is controlled by the proper application of voltage of the correct polarity thereto. The direction and speed of transport of web 14 is a function of the operation of motor 18, the motor being regulated by the control system comprised of the error signal generating means 26 (i.e. comparator or summing junction), tachometer 30, a suitable gain setting network 32 and, if required, an accelleration limiter 34. $V_{IN}$ is a DC reference signal admitting of a magnitude representing a desired web velocity and of a polarity representing a desired direction of web transport. The magnitude (and polarity) of the $V_{IN}$ reference signal may be derived from an external device such as a microprocessor, and corresponds to a desired web speed.

Error signal generating means 26 is coupled to the reference signal $V_{IN}$ and to the output of tachometer 30 (via amplifying network 32) the error signal generating means 26 being adapted to generate an output signal, hereafter designed an error signal, proportional to the difference between the input signal applied thereto and the output signal of tachometer 30. Error signal generating means 26 may thus comprise a conventional differencing or subtracting circuit such as a conventional differential amplifier, an algebraic resistance combining network, an operational amplifying circuit or the like. Amplifying means 28 may comprise a motor driving circuit coupled to the armature windings of motor 18 to supply the armature windings with energizing current proportional to the output of error signal generating means 26. It should be noted that a separate, conventional amplifier may be interposed between error signal generating means 26 and amplifier 28 to supply motor 18 with sufficient operating energy compatible therewith. Amplifier 28 is generally adapted to respond to the bidirectional signal applied thereto by error signal generating means 26 to supply direct energizing current to motor 18 of the required polarity.

The gain of accelleration limiter 34 is substantially maintained at unity, so that the output thereof is equal to the input after an appropriate amount of time. While $V_{IN}$ may change rapidly the use of accelleration limiter 34 is such to make its output move much more slowly. In essence, accelleration limiter 34 prevents the velocity loop from being overloaded, the loop never being requested to provide more accelleration than it is capable of producing in a controlled fashion. The velocity servo loop is defined to consist of tachometer 30, gain setting network 32 which, in essence, is a conventional operational amplifier having gain adjustment, and the error signal generating means 26 such that the motor drive amplifier 28 input signal is the difference between $V_{REF}$ and the effective tachometer signal from amplifier 32 (i.e., the velocity error).

The operation of the web transport control system will now be described. Let it initially be assumed that the transported web 14 is to be drive in a first, or forward direction from reel 10 to reel 12. Accordingly, reference signal $V_{IN}$ produces a positive d-c signal admitting of a predetermined magnitude. (Note that means may be provided to accellerate the web transport 14 to a predetermined speed prior to normal transport operation. However, the operation described hereinafter would be essentially similar.) If motor 18 is initially at rest, the voltages supplied to error signal generating means 26 via tachometer 30 is essentially zero. Accordingly, error signal generating means 26 is provided with the positive d-c signal supplied thereto by reference signal $V_{IN}$. The difference between the signal supplied by reference signal $V_{IN}$ and the output of the tachometer 30, the error signal, is recognized as being essentially the positive d-c signal produced by $V_{IN}$. The positive d-c error signal is amplified by amplifying means 28 which operates upon the amplified positive d-c error signal supplied thereto to generate a positive direct current of sufficient magnitude to energize motor 18. It may be appreciated that the energizing current now supplied to motor 18 by amplifying means 28 admits of a maximum amplitude. Amplifying means 28 corrects the error voltage at its input to a proportional, amplified current at its output. The supply of positive energizing current to motor 18 initiates the operation thereof resulting in the rotation of the armature of motor 18 and capstan 20 coupled thereto. As the motor is energized, the angular velocity of capstan 20 is increased and web 14 is transported from reel 10 to reel 12.

It is recognized that as the armature of motor 18 is energized, capstan 20 is caused to rotate and the web is caused to move in the direction of arrow 40. Consequentially, a voltage proportional to the web velocity is generated by tachometer 30. The output of tachometer 30 is coupled to amplifier 32. The output of amplifier 32 is compared with the positive signal $V_{REF}$ in the error signal generating means 26.

Error signal generating means 26 generates an error signal proportional to the difference between the reference voltage $V_{REF}$ applied thereto and the output of tachometer 30. Hence, the error signal applied to amplifying means 28 is indicative of the deviation between the actual velocity of the transported web and the desired velocity thereof.

If it is assumed that the transported web has not yet attained the desired velocity thereof, the comparison process continues and power amplifier 28 continues to generate an error current necessary to bring the velocity of web 14 to the desired velocity. Hence, the error signal is a positive d.c. signal. More particularly, since the velocity of web 14 is now approaching the desired velocity thereof, it is recognized that the magnitude of the energizing current supplied to motor 18 need not be as great as that of the energizing current previously supplied thereto. Nevertheless, since the energizing current is a direct function of the error signal produced by error signal generating means 26, the angular velocity of reel 10 is increased to further approach the desired web velocity thereof and, consequently, to reduce the magnitude of the generated error signal.

The foregoing operation is repeated until web 14 is transported at a velocity corresponding to the desired velocity represented by the magnitude of the reference signal $V_{REF}$. When such desired velocity is actually attained, the error signal generated by error signal generating means 26 is reduced substantially to zero and amplifying means 26 supplies motor 18 with a positive d.c. energizing current admitting of a sufficient magnitude to maintain the motor at the proper angular velocity to drive the web 14 accordingly.

In a rewind mode, for example, the above operation is reversed in the sense that a negative polarity energizing current is supplied to motor 18 via amplifier 28.

Figure 2:
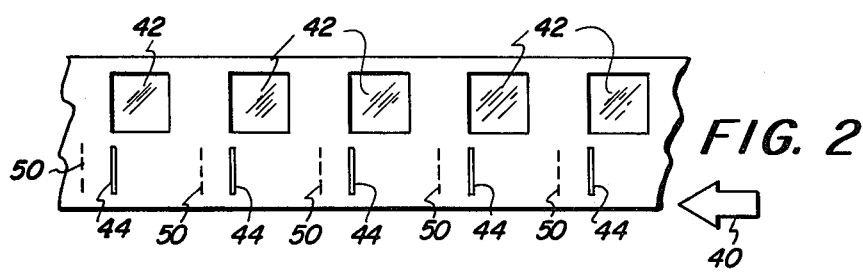
FIG. 2 shows a portion of a typical microfilm illustrating frames and reference marks associated therewith.

As set forth hereinabove, the type of velocity loop set forth hereinabove has been utilized in many areas where it is required to drive a web at a predetermined velocity. In particular, the aforementioned web transport system may be adapted for use to drive microfilm between reels wherein the microfilm comprises a plurality of images 42 as shown in FIG. 2. In those systems where the microfilm 14 is driven intermittently to sequentially expose each frame it is necessary to stop the film at a predetermined position so that each frame may be exposed, enlarged and copied onto a recording medium, such as a xerographic medium. This may be accomplished by providing transparent marks 44 aligned with the corresponding edge of each frame 42. If, for example, it is desired to have a particular frame 42 exposed (first frame shown in the figure), apparatus external to the system shown in FIG. 1 provides an appropriate input to information processing means 16 such that when a mark 44 corresponding to the selected frame passes under an aperture within processing means 16, an electrical signal is generated (an illumination-photodetector combination is provided in means 16 to generate a signal as each mark passes therethrough). This signal in turn causes $V_{IN}$ to go to zero. Although it would be advantageous to stop the web instantaneously when the mark is detected, the limited torque and film tension available, in conjunction with the finite system inertia, causes the film to overshoot. If the film transport is equiped with an accelleration limiter, the stopping action will be smoother and the overshoot greater. It should be noted that if the marks were applied to the film as shown by the line 50 in phantom, the system could be programmed to stop at the next adjacent frame, enough space being provided between marks 50 and the frame edge that the system torques and inertias or the accelleration limiter would have stopped the film at the desired location. However, in many microfilm reproducing systems it is required that the mark be positioned adjacent the edge of the microfilm frame and therefore a technique is required to compensate for the inevitable film overshoot.

Figure 3:
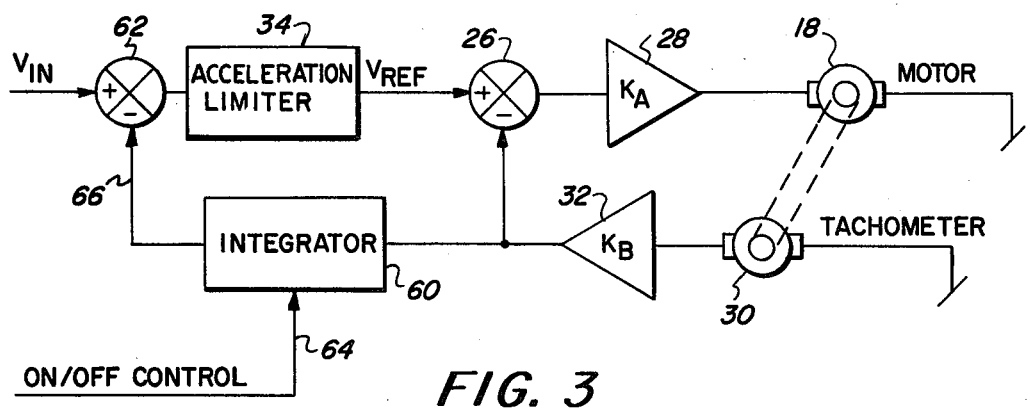
FIG. 3 is a block diagram of the web transport system of the present invention.

In accordance with the teachings of the present invention, a system is provided, as shown in FIG. 3, which returns the microfilm to the position it was when the mark was first detected. In essence, the system is similar to that shown in FIG. 1 with the addition of a controlled integrator 60 and an additional error generating means, or summing junction, 62. As will be explained in more detail hereinafter with reference to FIG. 4, an external control means provides an ON/OFF control signal on lead 64 which controls whether integrator 60 is on or off. During normal operations when the particular code associated with the frame selected has not been detected, integrator 60 is inhibited from operation and does not effect circuit performance. When the code is detected (code may be applied to apparatus 16 from an external apparatus via lead 17 in FIG. 1), a signal is generated on lead 29 and $V_{IN}$ is sent to zero by means not shown and, at the same time, integrator 60 is enabled via an appropriate signal on lead 64. Since the integrator output is initially zero as it has been inhibited from operating, its output has no immediate effect on system operation.

Since motor 18 takes a finite time to stop, tachometer 30 continues to provide an output during the time motor 18 is operating. The tachometer output signal is integrated by integrator 60 such that when the motor 18 actually stops (motor rotation in the original direction is stopped) integrator 60 holds a signal proportional to the distance traveled during the motor decelleration (overshoot). The output of integrator 60 is coupled to summing junction 62 via lead 66 as an input equivalent to $V_{IN}$ but opposite in polarity thereby commanding the motor 18 to rotate in the opposite direction. While motor 18 is retracing, the output of tachometer 30, the polarity of which is dependent on the direction that motor 18 rotates, is driving the integrator 60 back to zero. The speed of motor 18 and the integrator output will go towards zero simultaneously. If the system components are perfect, the final overshoot of the film as compared to its position when the event occurred will be zero.

Figure 4:
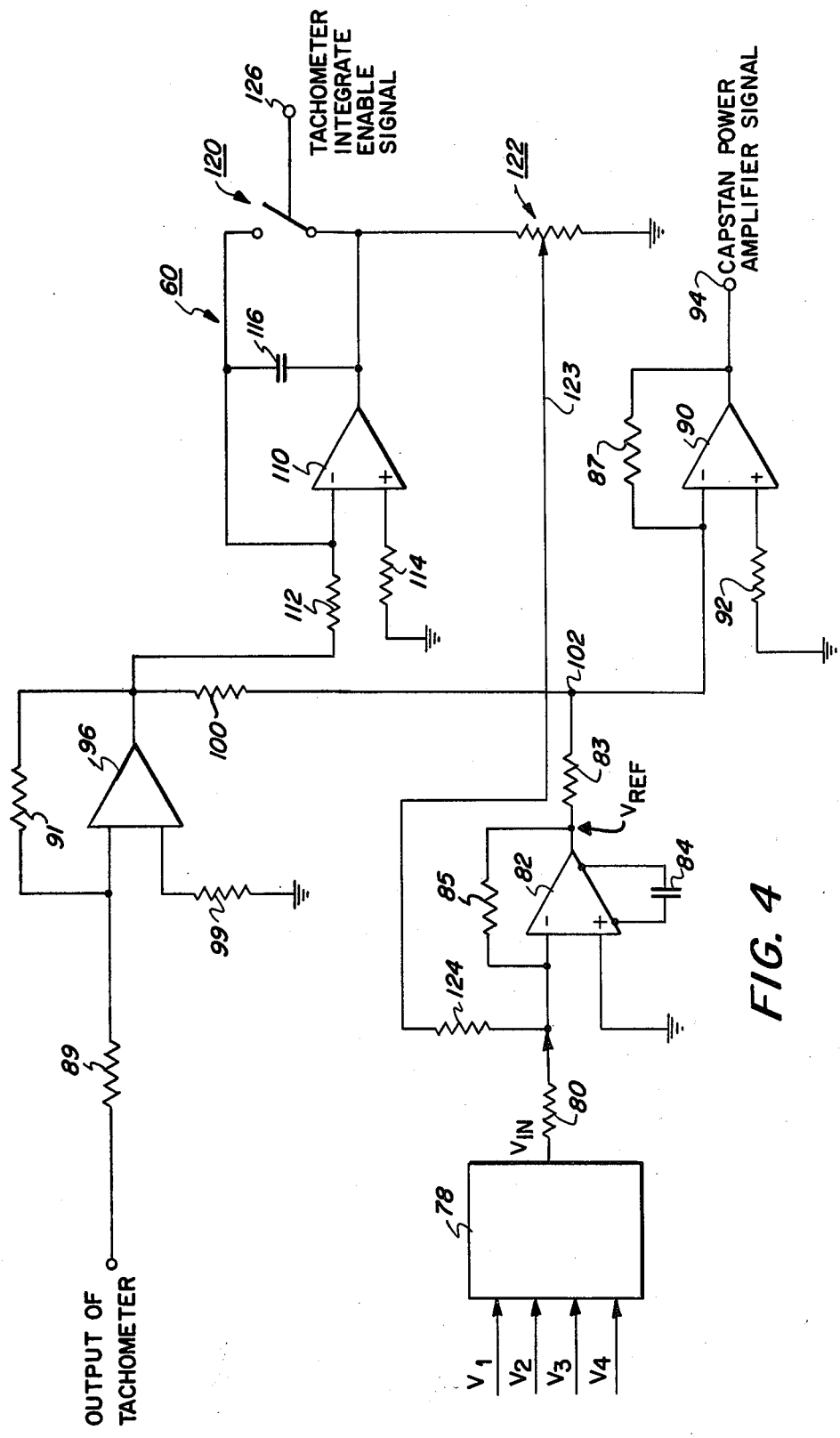
FIG. 4 is a schematic diagram of the block diagram of FIG. 3.

Referring now to FIG. 4, a schematic diagram of the block diagram shown in FIG. 3 is illustrated.

In particular, input signals V1, V2, V3 and V4 are generated by a device external to the system such as that provided by a microprocessor. For example, V1 could correspond to a signal representing the fast forward speed of the transport system shown in FIG. 3, V2 may represent the fast reverse speed, V3 the slow forward speed and V4 the slow reverse speed. Depending upon which of these signals are generated, the corresponding signal is provided by selector 78, the output thereof representing $V_{IN}$, which is of the correct magnitude and polarity for the desired speed. The signal $V_{IN}$ is applied through resistor 80 to the inverting input of an operational amplifier 82 which has a capacitor 84 coupled to selected pins of operational amplifier 82. The value of capacitor 84 is selected such that the slew rate of its output is much slower than that of $V_{IN}$. Typically, if amplifier 82 is an industry standard 748, capacitor 84 may be a value of 100 nanofarads yielding a slew rate of approximately 100 volts/sec. The output of operational amplifier 82 is connected through resistor 83 to the inverting input of operational amplifier 90, the positive input thereof being grounded via resistor 92. The output of operational amplifier 90, which corresponds to the motor drive amplifier, provides an output signal at terminal 94 which is applied to drive the capstan motor 18. The output of the tachometer 30 is applied through resistor 89 to the inverting input of operational amplifier 96. The positive input of the operational amplifier 96 is grounded via resistor 99, the output thereof being coupled to the inverting input of operational amplifier 90 via resistor 100. The summation node 102 whereby the output of amplifiers 82 and 96 are summed is equivalent to the error generator means 26 shown in FIGS. 1 and 3. The work done by amplifier 90 on node 102 via resistor 87 guarantees that the voltage on pin 94 is proportional to the algebraic sum of the voltages at the outputs of amplifiers 82 and 96.

The relative importance of the voltages at the outputs of amplifiers 82 and 96 is set by the relative values of resistors 83 and 100 respectively. The controlled integrator 60 is shown to comprise an operational amplifier 110 having its inverting input coupled to the output of amplifier 96 via resistor 112. The non-inverting input of amplifier 110 is coupled to ground via resistor 114. The output of operational amplifier 110 is coupled back to its inverting input via capacitor 116 to allow operational amplifier 110 to operate as an integrator. A switch 120 is coupled cross capacitor terminals as shown. The switch may be any suitable mechanical, electrical, or electro-mechanical switching device. The output of amplifiers 110 is coupled to one end of potentiometer 122, the other end being connected to ground, the adjustable tap 123 thereof being coupled back to the inverting input of operational amplifier 82 via resistor 124.

Controlling switch 120 via terminal 126 is a tachometer integrator enable (TIE) signal. When the TIE signal is applied to terminal 126, switch 120 acts an an open circuit across capacitor 116 and allows amplifier 110 to generate the integral of the output of amplifier 96. Further, this integral, appearing at the output of operational amplifier 110, is applied to potentiometer 122. A portion of this voltage is coupled to resistor 124 via adjustable tap 123 which supplies a proportional current to the inverting input of operational amplifier 82.

In operation, one of the leads corresponding to signals V1, V2, V3 and V4 is high and the selected output appears as $V_{IN}$, the signal being necessary to drive the film in either a forward or reverse direction, at a fast or slow speed. The signal $V_{IN}$ is then applied via resistor 80 to the inverting input of operational amplifier 82, the output of which is applied via resistor 83 to Node 102. The output of the tachometer 30 which is a DC signal corresponding to the actual velocity of the film transport is applied via operational amplifier 96 and resistor 100 to the summing Node 102. The work done by amplifier 90 on Node 102 via resistor 87 guarantees that the voltage at the output terminal 94 is proportional to the algebraic sum between the actual velocity, represented by the output of tachometer 30, and the desired velocity as represented by the signal $V_{IN}$. When a signal $V_{IN}$ is applied to the system to drive the film at a particular speed and in a selected direction, the TIE signal is not applied to terminal 126 so that switch 120 acts as a short circuit across capacitor 116, so the output of the operational amplifier 110 is essentially zero and does not affect circuit operation. When an event is detected, i.e., a selected frame on the microfilm has been detected and a signal generated on lead 29, $V_{IN}$ is caused to go to zero by apparatus external to the circuit shown. Simultaneously therwith the TIE signal is applied to terminal 126 whereby the switch 120 becomes an open circuit allowing the integrator 60 to be fully operative. At this time, since the motor 18 continues to turn, a signal will still be generated at the output of tachometer 30 and applied via resistor 112 to the inverting input of operational amplifier 110. The operational amplifier 110 integrates the signal applied to its inverting input and privides an integrated voltage signal at its output which is applied across potentiometer 122. The output of integrator 60 is proportional to the distance that the film passes the detected mark (overshoot) until it comes to a stop. The output across potentiometer 122 is applied via adjustable tap 123 to the inverting input of operational amplifier 82 via resistor 124. Since $V_{IN}$ is now zero, the only input to operational amplifier 82 is of a magnitude which corresponds to the distance the film traveled past the detected mark (corresponding to system overshoot). The polarity of the input applied to this terminal is opposite to what the drive signal $V_{IN}$ was before it went to zero and therefore the output of operational amplifier 82 is of the reverse polarity compared to its polarity prior to the occurrance of the event. The output of operational amplifier 82 is applied via resistor 83 to the inverting input of operational amplifier 90 such that the output signal at terminal 94 (power amplifier signal) is of a polarity such that the transport system is driven in a direction opposite to that which it was going when $V_{IN}$ was sent to zero. Since the motor shaft is caused to now rotate in the reverse direction, tachometer 30 generates an output of an opposite polarity to that produced when the motor shaft was driven in the original direction, the output being coupled to the Node 102 via resistor 100. The output of amplifier 96 does two things simultaneously as the motor shaft is being driven in the reverse direction. Initially, the output thereof is coupled to the integrating circuit 60 and operates to drive the stored signal on capacitor 116 towards zero. This is reflected in the voltage across potentiometer 122 which essentially drives the voltage applied to the inverting terminal of operational amplifier 82 towards zero. This decreasing signal at the output of operational amplifier 82 is also simultaneously compared with the decreasing signal at the output of operational amplifier 96 as the motor slowly comes to rest in the reverse direction. If the tap 123 of potentiometer 122 is correctly set, the total signal at Node point 102 is driven to zero at the point in time when the film has been driven in its reverse direction to the point it occupied when the desired mark was first detected.

Figure 5:
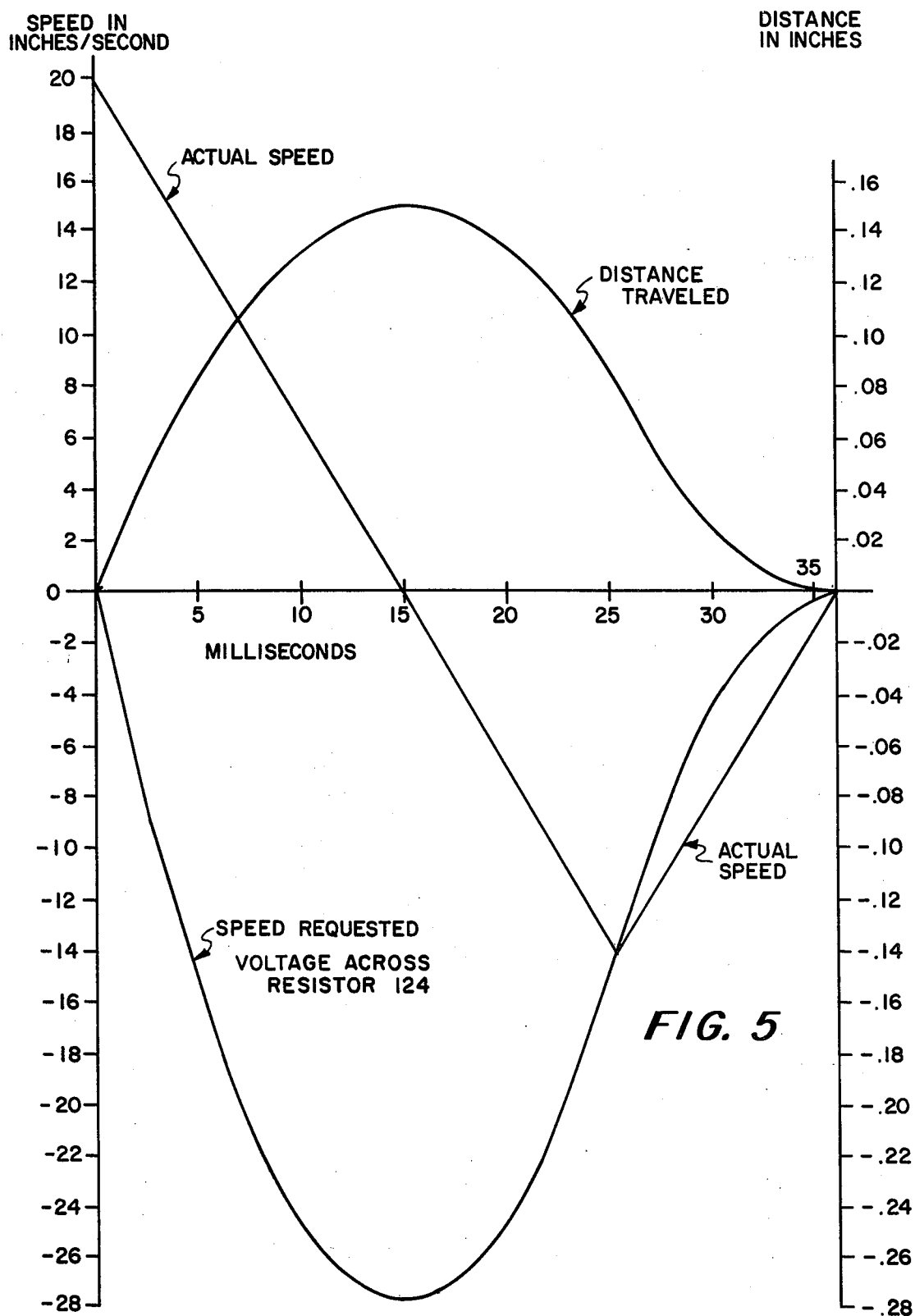
FIG. 5 is a graph further illustrating the operation of the present invention.

The operation of the present invention may be further explained by reference to the graph shown in FIG. 5 taken for a specific case in point. It is assumed that the microfilm is travelling at 20 inches per second when the desired mark is detected, $V_{IN}$ (the requested speed) is sent to zero. The time that it takes to bring the system to the correct location is measured from the detection of this mark. The rate limiter 34 is selected such that system may be decellerated from 20 inches per second to zero in approximately 15 milliseconds. Since, at the time of the event (detection of the mark) plus the 15 milliseconds, the output of the integrator 60 is large and of the opposite polarity of the original $V_{IN}$ the capstan speed changes polarity and increases. The gain of the integrator 60 is preferably set by adjustable potentiometer 122 such that the actual speed starts its return to zero when half the retrace is accomplished. For the example illustrated in FIG. 5, the total time to final position is attained approximately 2.4 times the nominal decelleration time of 15 milliseconds. Selecting the integrator gain setting such that the actual speed starts its return to zero when half of the retrace is accomplished is the preferable setting in that minimum net overshoot is provided.

It should be noted that either digital or analog tachometers may be utilized (the digital tachometer requiring digital/analog conversion) and that different tachometers may be utilized for driving the integrator and the velocity servo loop. It should further be noted that the accelleration limiter 34 may be not necessary if the servo loop can be operated in a non-linear mode (current limiting in the motor drive amplifier, for example). Optimum performance (i.e., minimum retrace time) only requires known accellerations/decellerations so that the integrator gain may be appropriately set.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. For use in a web transport system wherein a web is driven at a desired velocity and in a desired direction in response to an input signal, apparatus for stopping the web at a position the web occupied when an event occurred comprising:
   drive means responsive to a drive signal for transporting said web;
   velocity determining means responsive to the movement of said web for producing a signal representing the web velocity;
   means for detecting the occurrence of said event;
   distance detecting means responsive to the movement of said web for producing a signal representing the distance travelled by said web after the occurrence of said event;
   means responsive to said detecting means for enabling said distance detecting means;
   means responsive to said detecting means for terminating said input signal;
   first means for combining said input signal with said distance signal and generating a composite output signal representing the total thereof, and second means for comprising said composite signal with said velocity signal and generating said drive signal representing the difference therebetween.

2. The apparatus of claim 1 wherein said web is microfilm.

3. The apparatus of claim 1 further comprising a supply reel and a take-up reel for paying out and receiving, respectively, said web.

4. The apparatus of claim 1 wherein said drive means comprises:
   a motor responsive to said drive signal; and
   web transporting means driven by said motor for transporting said web.

5. The apparatus for claim 4 wherein said drive means further comprises:
   means coupled to the armature winding of said motor for amplifying said drive signal.

6. The apparatus for claim 4 wherein said web transporting means is a capstan.

7. The apparatus of claim 4 wherein said velocity determining means comprises:
   a tachometer operatively associated with said motor; and
   a gain adjustable operational amplifier coupled to said tachometer.

8. The apparatus of claim 1 wherein said distance detecting means comprises:
   said velocity determining means; and
   means for converting said velocity signal to produce a signal representing the distance travelled by said web.

9. The apparatus of claim 8 wherein said converting means is an integrator.

10. The apparatus of claim 1 wherein a detectable mark on said web represents the event to be detected and said event detecting means comprises:
    an illumination - photoconductor means for providing a signal to said distance detecting means and to said terminating means upon the detection of said mark.

11. The apparatus of claim 1 further comprising means coupled between the output of said first comprising means and the signal input of said second comparing means comprising means for controlling the rise rate of said combined signal to a predetermined rate.

12. For use in a web transport system wherein a web is driven at a desired velocity and in a desired direction in response to an input command, a method for stopping the web at a position the web occupied when an event occurred comprising the steps of:
    transporting said web in response to a drive signal;
    generating a signal representing the actual web velocity while said web is moving;
    comparing said input command with said velocity signal and generating said drive signal representing the difference therebetween;
    detecting the occurrence of said event;
    at the occurrence of said event, setting said input command to zero;
    generating a signal representing the distance travelled by said web after the occurrence of said event;
    combining said input command having a zero value after the event with said distance signal and generating a composite signal representing the total thereof; and
    comparing said composite signal with said velocity signal and generating said drive signal representing the difference therebetween.

* * * * *

UNITED STATES PATENT AND TRADEMARK OFFICE
CERTIFICATE OF CORRECTION

PATENT NO. : 4,095,732
DATED : June 20, 1978
INVENTOR(S) : Lauren V. Merritt

It is certified that error appears in the above-identified patent and that said Letters Patent are hereby corrected as shown below:

Column 9, line 60, "comprising" should read -- comparing --.

Column 10, lines 37-38, "comprising" should read -- combining --.

*Signed and Sealed this*

*Twenty-seventh* Day of *November 1979*

[SEAL]

Attest:

RUTH C. MASON
*Attesting Officer*

LUTRELLE F. PARKER
*Acting Commissioner of Patents and Trademarks*